(12) United States Patent
Howard et al.

(10) Patent No.: US 7,106,782 B2
(45) Date of Patent: Sep. 12, 2006

(54) METHOD AND APPARATUS FOR ROTATING A PHASE OF A MODULATED SIGNAL

(75) Inventors: Michael A. Howard, San Diego, CA (US); Peter J. Black, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 26 days.

(21) Appl. No.: 10/322,246

(22) Filed: Dec. 17, 2002

(65) Prior Publication Data

US 2003/0123526 A1 Jul. 3, 2003

(51) Int. Cl.
*H04B 1/707* (2006.01)

(52) U.S. Cl. .................. 375/146; 455/126; 455/127.2

(58) Field of Classification Search ............. 375/130, 375/146, 295, 296, 297; 455/114.3, 127.1, 455/127.2, 115.1, 126; 330/2
See application file for complete search history.

(56) References Cited

U.S. PATENT DOCUMENTS

| | | | |
|---|---|---|---|
| 4,901,307 A | | 2/1990 | Gilhousen et al. ............ 370/18 |
| 5,103,459 A | | 4/1992 | Gilhousen et al. ............. 375/1 |
| 5,287,555 A | * | 2/1994 | Wilson et al. ........... 455/115.1 |
| 5,561,395 A | * | 10/1996 | Melton et al. ................. 330/2 |
| 5,732,334 A | * | 3/1998 | Miyake ...................... 455/126 |
| 5,770,971 A | * | 6/1998 | McNicol ...................... 330/52 |
| 5,933,767 A | * | 8/1999 | Leizerovich et al. ........ 455/126 |
| 6,097,714 A | * | 8/2000 | Nagatani et al. ............ 370/342 |
| 6,535,562 B1 | * | 3/2003 | Mohseni et al. ............ 375/296 |
| 6,587,513 B1 | * | 7/2003 | Ichihara ..................... 375/296 |

FOREIGN PATENT DOCUMENTS

| | | |
|---|---|---|
| EP | 0738050 | 10/1996 |
| GB | 2265270 | 9/1993 |
| GB | 2300545 | 11/1996 |

* cited by examiner

*Primary Examiner*—Young T. Tse
(74) *Attorney, Agent, or Firm*—Philip Wadsworth; Sandra L. Godsey; Don Kordich (57) ABSTRACT

Techniques to adjust the phase rotation of a modulated signal to compensate for the phase rotation introduced by circuit elements associated with the transmit signal path. In one implementation, at least one control signal is received, with each control signal being provided to adjust a particular characteristic (e.g., gain, bias current) of one or more circuit elements (e.g., VGA, PA) associated with the transmit signal path. The circuit elements can be located directly in, or operatively coupled to, the transmit signal path. A phase rotation corresponding to an operating state defined by the received control signal(s) is then determined, and the phase of the modulated signal is rotated by an amount related to the determined phase rotation. The phase rotation compensation can be performed at various locations along the transmit signal path by rotating either the data, the PN sequences used to spectrally spread the data, or the carrier signals used to modulate the data.

25 Claims, 8 Drawing Sheets

METHOD AND APPARATUS FOR ROTATING A PHASE OF A MODULATED SIGNAL

CROSS REFERENCE

This application claims priority from U.S. application Ser. No. 09/397,429, filed Sep. 17, 1999, entitled "Method and Apparatus for Rotating a Phase of a Modulated Signal" and assigned to the Assignee of the present invention.

BACKGROUND OF THE INVENTION

I. Field of the Invention

The present invention relates to data transmissions. More particularly, the present invention relates to method and apparatus for rotating a phase of a modulated signal.

II. Description of the Related Art

In many communications systems, data is processed, modulated, and conditioned prior to transmission to a receiving device. The data processing can include encoding for compression, coding for error detection/correction, covering to provide orthogonal channels, spreading to spectrally disperse the data, and others. The processed data is then modulated with one or more carrier signals to generate a modulated signal more suitable for transmission. Various modulation schemes can be used such as quadrature phase shift keying (QPSK), offset QPSK, quadrature amplitude modulation (QAM), frequency modulation (FM), amplitude modulation (AM), and others. The modulated signal is typically further conditioned (e.g., buffered, amplified, filtered, and so on) prior to transmission.

The signal processing is performed by a number of circuit elements in a transmit signal path, and some of these elements can introduce distortions to the signal. For example, the non-linearity of a circuit element (e.g., amplifier, mixer) can generate intermodulation distortions. Moreover, the circuit elements can introduce phase rotation in the modulated signal. Conventionally, these distortions are maintained at an acceptable levels by proper design of the circuit elements.

To improve performance and enhance system capacity, the transmit signal path can include circuit elements that can be selectively controlled based on the operating condition of the transmitting device. The transmit signal path may include, for example, one or more variable gain elements having gains that can be adjusted to provide a variable output transmit power level. The transmit signal path may further include active circuit elements having bias currents that can be adjusted to reduce power consumption while providing the required (e.g., linearity, bandwidth) performance.

The characteristics of the modulated signal can change as the variable circuit elements in the transmit signal path are adjusted. Specifically, the phase of the modulated signal can rotate as the circuit elements are adjusted. When the circuit elements are adjusted in a step-wise fashion, the modulated signal can include phase discontinuities, which can cause performance degradation. Such phase transitions can be tracked at the receiver. However, this places a constraint on the bandwidth of the phase estimate. In order to operate at very low signal-to-noise ration (SNR), it is desirable to use narrowband estimators (i.e., having long time constant) that, in turn, have poor tracking performance.

Thus, techniques that can rotate the phase of the modulated signal to compensate for the phase rotation due to adjustments of circuit elements associated with the transmit signal path are highly desirable.

SUMMARY OF THE INVENTION

The present invention provides techniques to adjust the phase rotation of a modulated signal, to compensate for the phase rotation introduced by circuit elements associated with a transmit signal path. By rotating the phase of the modulated signal by approximately the same amount introduced by the circuit elements, in the opposite direction, and at approximately the same time, phase discontinuity in the modulated signal is reduced. The phase rotation compensation can be performed at various locations along the transmit signal path. In some embodiments, the phase rotation is performed digitally by rotating either the data, the PN sequences used to spectrally spread the data, or the carrier signals used to modulate the data. The phase rotation compensation can be applied to many modulation techniques including CDMA, TDMA, FDMA, and others, and can be applied to many modulation formats including QPSK, OQPSK, PSK, QAM, and others.

An embodiment of the invention provides a method for providing a phase rotation of a modulated signal from a transmit signal path. In accordance with the method, at least one control signal is received, with each control signal being provided to adjust a particular characteristic (e.g., gain, bias current) of one or more circuit elements (e.g., VGA, PA) associated with the transmit signal path. The circuit element(s) can be located directly in, or operatively coupled to, the transmit signal path. A phase rotation corresponding to an operating state defined by the received at least one control signal is then determined, and the phase of the modulated signal is rotated by an amount related to, or approximating, the determined phase rotation.

The phase rotation can be achieved with a complex multiplier, and can be performed digitally. The phase rotation can also be performed at designated times such that phase discontinuities in the modulated signal are reduced as the circuit element(s) are adjusted. The magnitude of the phase rotation can have any resolution and accuracy, and can be stored in a look-up table.

For some CDMA systems, the phase of the modulated signal is rotated by rotating the phases of the PN sequences used to spectrally spread the data. For these systems, at least one data stream and a pair of PN sequences are received. The received data stream(s) are then spectrally spread with the PN sequences. The PN sequences can comprise the short PN I and PN Q sequences defined by the IS-95-A standard.

Another embodiment of the invention provides a method for providing a phase rotation of an output signal from a CDMA transmitter. In accordance with the method, at least one data stream and a pair of PN sequences are received. The received data stream(s) are then spectrally spread with the PN sequences to generate spread data. The spread data is modulated to generate a modulated signal that is then conditioned by at least one circuit element to generate the output signal. At least one control signal is received, with each control signal used to adjust a particular characteristic (e.g., gain, bias current) of one or more circuit elements. A phase rotation corresponding to an operating state defined by the received control signal(s) is determined, and the phases of the PN sequences are rotated by an amount related to, or approximating, the determined phase rotation to provide the phase rotation of the output signal.

Yet another embodiment of the invention provides a transmitter that includes a signal processor coupled to a controller and to at least one circuit element. The signal processor receives and multiplies at least one data stream with at least one carrier signal to generate a modulated signal. The circuit element(s) receive and condition the modulated signal to generate an output signal. At least one control signal is provided to the circuit element(s), with each control signal configured to adjust a particular characteristic of one or more circuit elements. The controller receives the control signal(s) and determines a phase rotation corresponding to an operating state defined by the received control signal(s). The phase of the output signal is rotated by an amount related to, or approximating, the determined phase rotation.

The signal processor may include a spreader that receives and spectrally spreads the data stream(s) with a pair of PN sequences to generate spread data. Alternatively or additionally, the signal processor may include a modulator that receives and modulates the data stream(s) with an inphase carrier signal and a quadrature carrier signal to generate the modulated signal. The phase of the modulated signal can be rotated by rotating the phases of the PN sequences, the phases of the data streams, or the phases of the carrier signals. The controller may also include a look-up table that receives the control signal(s) and provides a phase rotation value corresponding to an operating state defined by the received control signal(s).

The invention can be extended to provide phase adjustment of the modulated signal to compensate for phase shifts introduced by the circuit elements associated with the transmit signal path.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
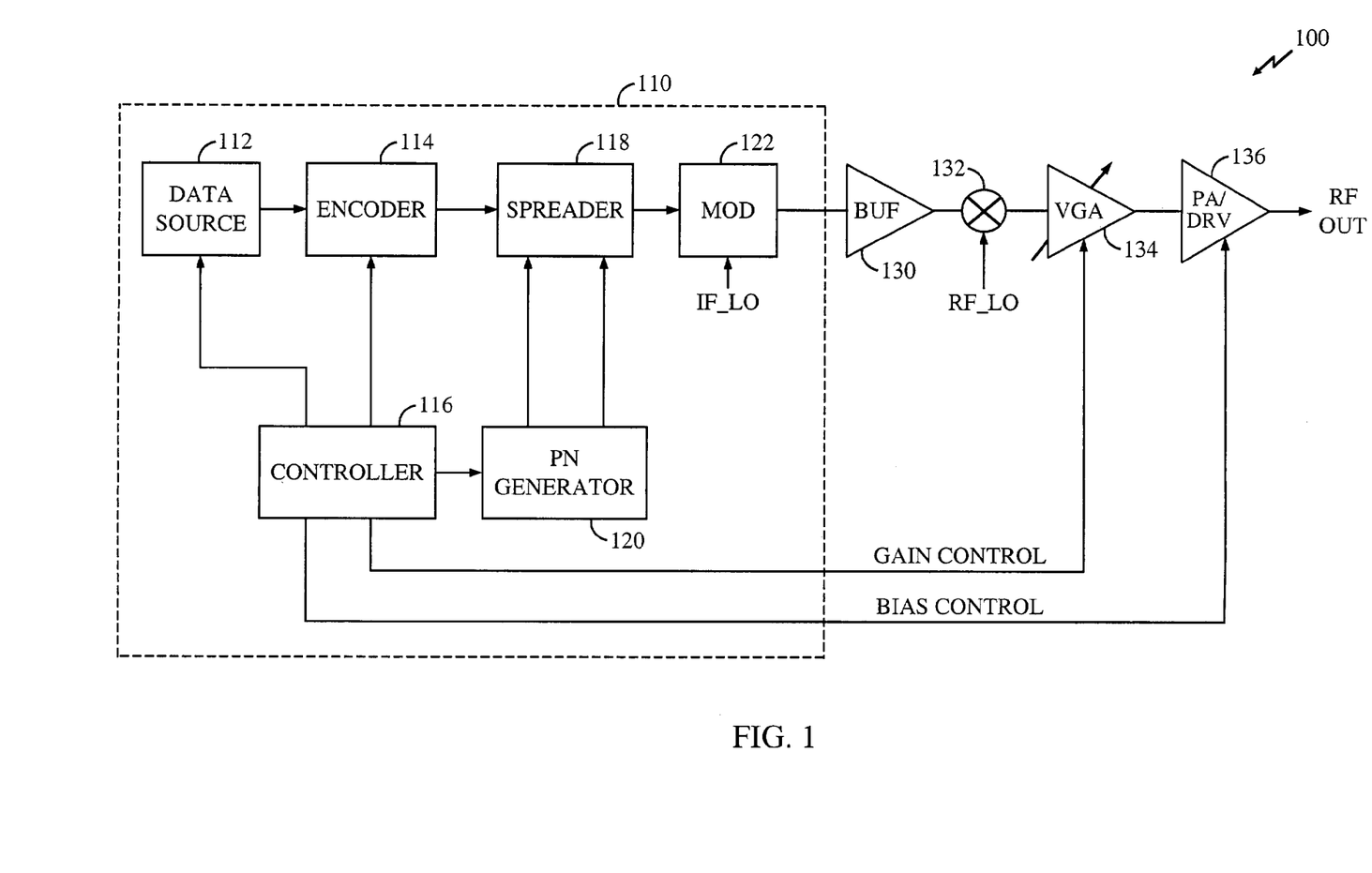
FIG. 1 shows a block diagram of a specific embodiment of a transmitter that incorporates the phase rotation mechanism of the invention.

FIG. 1 shows a block diagram of a specific embodiment of a transmitter 100 that incorporates the phase rotation mechanism of the invention. Within a transmitter unit 110, data from a data source 112 is partitioned into data frames and provided to an encoder 114. A controller 116 can direct the partition and transfer of data from data source 112, and can also provide additional data and messages to encoder 114. Encoder 114 encodes the received data and messages in accordance with a particular encoding format and provides the encoded data to a spreader 118. Spreader 118 also receives a pair of pseudorandom noise (PN) sequences from a PN generator 120, and spectrally spreads the encoded data and messages with the PN sequences to generate spread data. The spread data is provided to a modulator (MOD) 122 that modulates the data with an intermediate frequency carrier signal (IF_LO) in accordance with a particular modulation format (e.g., QPSK) to generate an IF modulated signal. Spreader 118 and modulator 122 are part of a signal processor that receives the data, the PN sequences, and the IF carrier signal (IF_LO) and generates the IF modulated signal. Some of the circuit elements are described in more detail below.

The IF modulated signal is provided to a buffer 130 that buffers the signal and provides the buffered signal to a mixer 132. Mixer 132 also receives another carrier signal (e.g., a sinusoid) at a radio frequency (RF_LO), and upconverts the buffered signal with the RF_LO to generate a RF signal. Mixer 132 can be implemented with a complex multiplier. The RF signal is provided to a variable gain amplifier (VGA) 134 that amplifies the signal with a gain determined by a gain control signal from controller 116. The amplified RF signal is provided to a power amplifier/driver (PA/DRV) 136 that provides the required signal drive. To conserve power, the bias current of PA/DRV 136 can be adjusted by a bias control signal from controller 116.

The modulated signal from PA/DRV 136 is typically filtered by an external filter to remove images and spurious signals. The filtered signal is then routed through an isolator and a duplexer and transmitted via an antenna to a receiving device. These elements are not shown in FIG. 1.

Transmitter 100 can be designed to implement various code division multiple access (CDMA) standards. For example, transmitter 100 can be designed to conform to: (1) the "TIA/EIA/IS-95-A Mobile Station-Base Station Compatibility Standard for Dual-Mode Wideband Spread Spectrum Cellular System," (2) the TIA/EIA/IS-98-A, -B, and -C entitled "Recommended Minimum Performance Standard for Dual-Mode Spread Spectrum Cellular and PCS Mobile Stations," (3) "The cdma2000 ITU-R RTT Candidate Submission," and (4) "The ETSI UMTS Terrestrial Radio Access (UTRA) ITU-R RTT Candidate Submission," which are herein referred to as the IS-95-A standard, the IS-98 standard, the IS-2000 standard or submission, and the WCDMA standard or submission, respectively. These standards are incorporate herein by reference.

Transmitter 100 can further be designed to implement various CDMA architectures such as that described in U.S. Pat. No. 4,901,307, entitled "SPREAD SPECTRUM MULTIPLE ACCESS COMMUNICATION SYSTEM USING SATELLITE OR TERRESTRIAL REPEATERS," U.S. Pat. No. 5,103,459, entitled "SYSTEM AND METHOD FOR GENERATING WAVEFORMS IN A CDMA CELLULAR TELEPHONE SYSTEM," and U.S. patent application Ser. No. 08/963,386, entitled "METHOD AND APPARATUS FOR HIGH RATE PACKET DATA TRANSMISSION," filed Nov. 3, 1997, now U.S. Pat. No. 6,574,211, issued on Jun. 3, 2003 to Padovani et al. These patents and patent applications are assigned to the assignee of the present invention and incorporate herein by reference. It will be recognized by one skilled in the art that the invention can be adopted for application to the CDMA standards and architectures identified above and other pending and future CDMA standards and architectures.

Various modifications can be made to the transmitter embodiment shown in FIG. 1. For example, the digital signal processing can include additional, fewer, or different steps than those shown in FIG. 1. For example, the signal processing can include symbol repetition, symbol puncturing, interleaving, and so on, as is known in the art. Also, fewer or additional filter, buffer, mixer, and amplifier stages can be provided in the transmit signal path. The elements can further be arranged in different configurations. In a specific implementation, transmitter unit 110 is implemented within one integrated circuit and the remaining circuit elements are implemented within another integrated circuit, although different number of integrated circuits and/or discrete elements can be used.

As shown in FIG. 1, it is sometimes advantageous or required to adjust some characteristics of some of the circuit elements associated with the transmit signal path. For example, one or more variable gain elements (e.g., VGA 134) may be provided to allow for adjustment of the output transmit power level. The gain adjustment may be necessary, for example, to maintain a particular level of performance (e.g., a particular bit-error-rate) at the receiving device while reducing interference to other units in the system. In addition, some circuit elements within the transmit signal path (e.g., PA/DRV 136) may have their bias currents adjusted to conserve power and extend operating life. An example of an amplifier having adjustable bias current is described in U.S. Pat. No. 6,175,279, issued on Jan. 16, 2001 entitled "AMPLIFIER With ADJUSTABLE BIAS CURRENT," assigned of the assignee of the present invention, and incorporate herein by reference. High bias current is typically used when transmitting at a high output transmit power level, and low bias current is used at other times to conserve power.

The adjustment of a circuit element affects the desired circuit characteristic (e.g., gain, bias current), but may also affect other characteristics of the signal being processed. For example, adjustment of the gain of VGA 134 affects the signal level, as expected, but also affects the phase of the modulated signal, which may be undesirable or unacceptable. Similarly, adjustment of the bias current of PA/DRV 136 affects the drive capability of the circuit, as expected, but typically also affects the phase of the modulated signal. The phase of the modulated signal varies, or rotates, with the control signals used to adjust the circuit elements associated with the transmit signal path.

In accordance with the invention, the phase of the modulated signal is rotated to compensate for the phase rotation due to adjustments of the circuit elements. For example, if a particular phase rotation is introduced when a variable gain element is adjusted from one gain setting to another gain setting, the phase of the modulated signal is rotated by approximately the same amount and in the opposite direction at approximately the time of the circuit adjustment. In this manner, phase discontinuity in the modulated signal is reduced, which can provide improved demodulation performance and better signal tracking at the receiving device.

The phase rotation compensation can be performed at any point along the transmit signal path. In a specific embodiment, the phase rotation is performed digitally, for ease of implementation and to provide consistent performance. For clarity, a specific implementation of the phase rotation of the invention is described below for a specific transmitter design.

Figure 2:
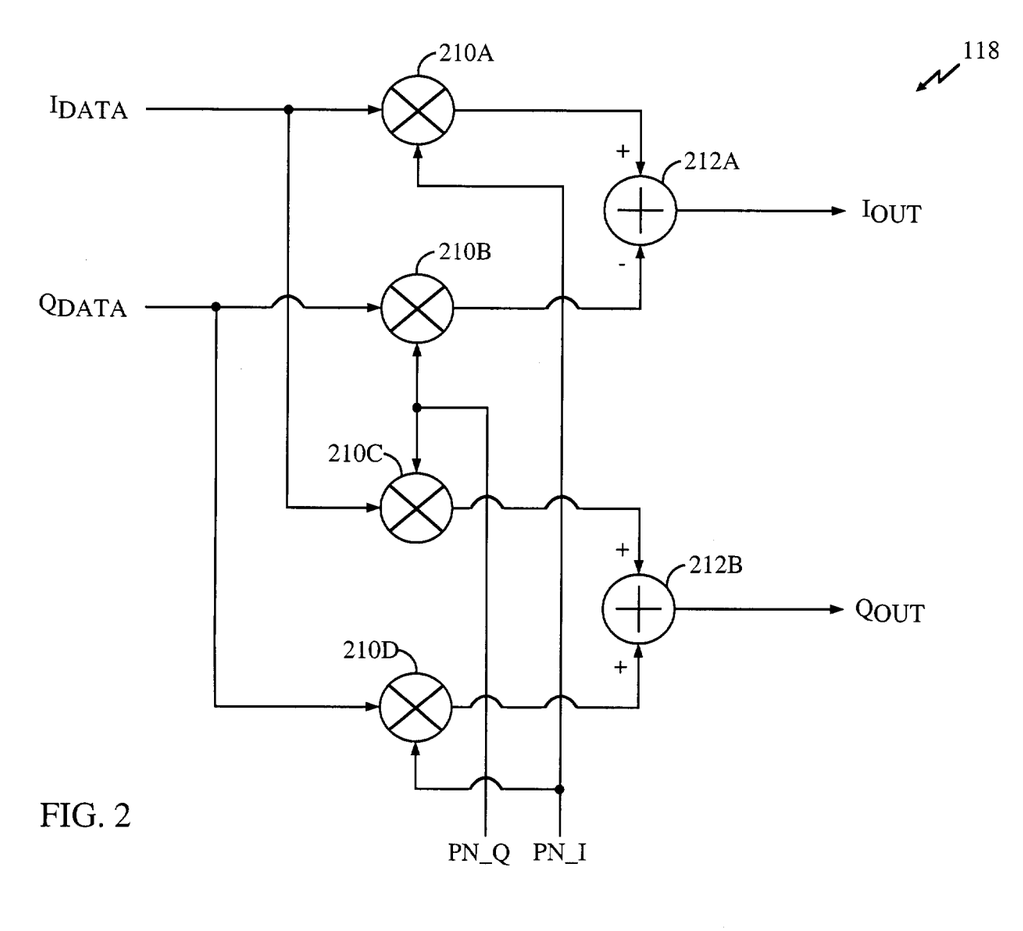
FIG. 2 shows a block diagram of a specific embodiment of a spreader.

FIG. 2 shows a block diagram of a specific embodiment of spreader 118. Spreader 118 is a complex multiplier that receives a "complex" data input (represented as $I_{DATA}+jQ_{DATA}$) and a "complex" PN sequence (represented as PN_I+jPN_Q), multiplies the complex data input with the complex PN sequence, and provides a "complex" data output (represented as $I_{OUT}+jQ_{OUT}$). In actual implementation, $I_{DATA}$ and $Q_{DATA}$ are simply two input data streams and PN_I and PN_Q are simply two PN sequences. The PN_I and PN_Q sequences are spread spectrum signals generated from two PN codes, as defined by the particular CDMA standard or system being implemented. The $I_{DATA}$ and $Q_{DATA}$ are spectrally spread by multiplication with the PN_I and PN_Q sequences, and the resultant products are cross-added to generate the $I_{OUT}$ and $Q_{OUT}$ spread data outputs.

As shown in FIG. 2, spreader 118 receives the $I_{DATA}$ and $Q_{DATA}$ and the PN_I and PN_Q sequences. The $I_{DATA}$ is provided to multipliers 210a and 210c and the $Q_{DATA}$ is provided to multipliers 210b and 210d. Similarly, the PN_I sequence is provided to multipliers 210a and 210d and the PN_Q sequence is provided to multipliers 210b and 210c. Each multiplier 210 multiplies, or spectrally spreads, the received input data with the received PN sequence to generate a respective output spread data. The outputs of multipliers 210a and 210b are provided to a summer 212a that subtracts the output of multiplier 210b from the output of multiplier 210a to generate the $I_{OUT}$ spread data. Similarly, the outputs of multipliers 210c and 210d are provided to a summer 212b that combines the outputs to generate the $Q_{OUT}$ spread data. The function performed by spreader 118 and the spread data outputs can be expressed as:

$$(I_{OUT}+jQ_{OUT})=(I_{DATA}+jQ_{DATA})\cdot(PN\_I+jPN\_Q), \quad (1)$$

$$I_{OUT}=(I_{DATA}\cdot PN\_I)-(Q_{DATA}\cdot PN\_Q), \text{ and} \quad (2)$$

$$Q_{OUT}=(I_{DATA}\cdot PN\_Q)+(Q_{DATA}\cdot PN\_I). \quad (3)$$

Spreader 118 effectively modulates the $I_{DATA}$ and $Q_{DATA}$ data streams with the PN_I and PN_Q sequences via a complex multiply operation.

Figure 3:
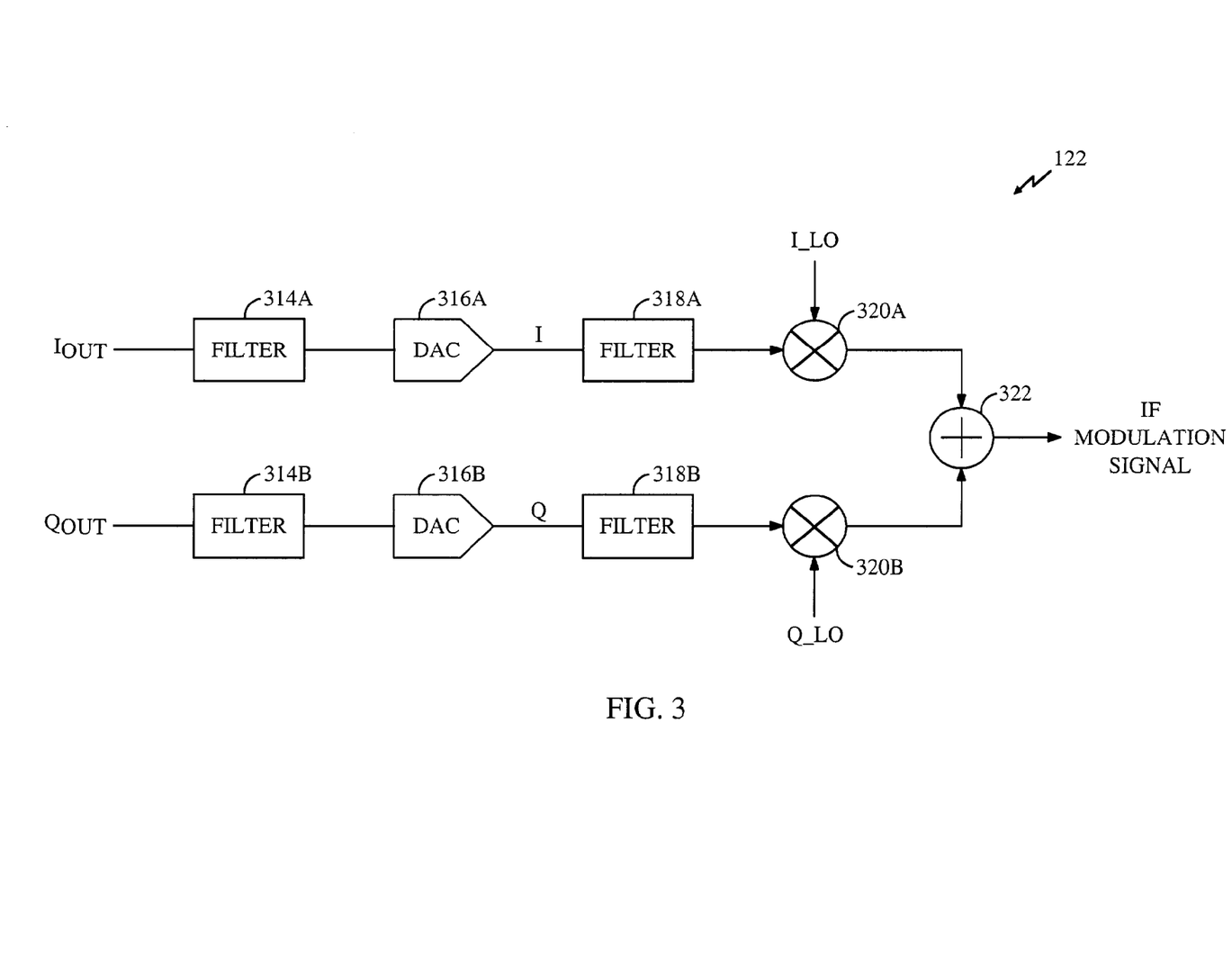
FIG. 3 shows a block diagram of a specific embodiment of a modulator.

FIG. 3 shows a block diagram of a specific embodiment of modulator 122. The spread data $I_{OUT}$ and $Q_{OUT}$ are provided to respective filters 314a and 314b that filter the data. Filters 314 can also oversample the received data, by performing zero-fill and lowpass filtering in a manner known in the art. The processed data from filters 314a and 314b are provided to respective digital-to-analog converters (DACs) 316a and 316b that convert the data into I and Q analog signals. The analog signals are provided to lowpass filters 318a and 318b that suppress the images at multiple times (e.g., 1×, 2×, 3×, . . . ) the conversion rate of DACs 316. Filters 314 or 318 can further perform sinx/x correction in a manner known in the art. The I and Q filtered signals are provided to respective multipliers 320a and 320b that also receive the respective inphase (I_LO) and quadrature (Q_LO) carrier signals generated from the IF_LO. Each multiplier 320 modulates the data with the respective carrier signal to generate a modulated component. The I and Q modulated components are provided to a summer 322 that combines the components to generate an IF modulated signal. Multipliers 320 and summer 322 perform quadrature modulation of the I and Q signals with the inphase and quadrature carrier signals.

In some transmitter designs, the quadrature modulation is performed digitally. In these transmitter designs, the I and Q data from respective filters 314a and 314b are digitally modulated with the inphase and quadrature carrier signals. The digital I and Q modulated components are then combined, possibly filtered, and provided to a DAC that generates the IF modulated signal.

Figure 4:
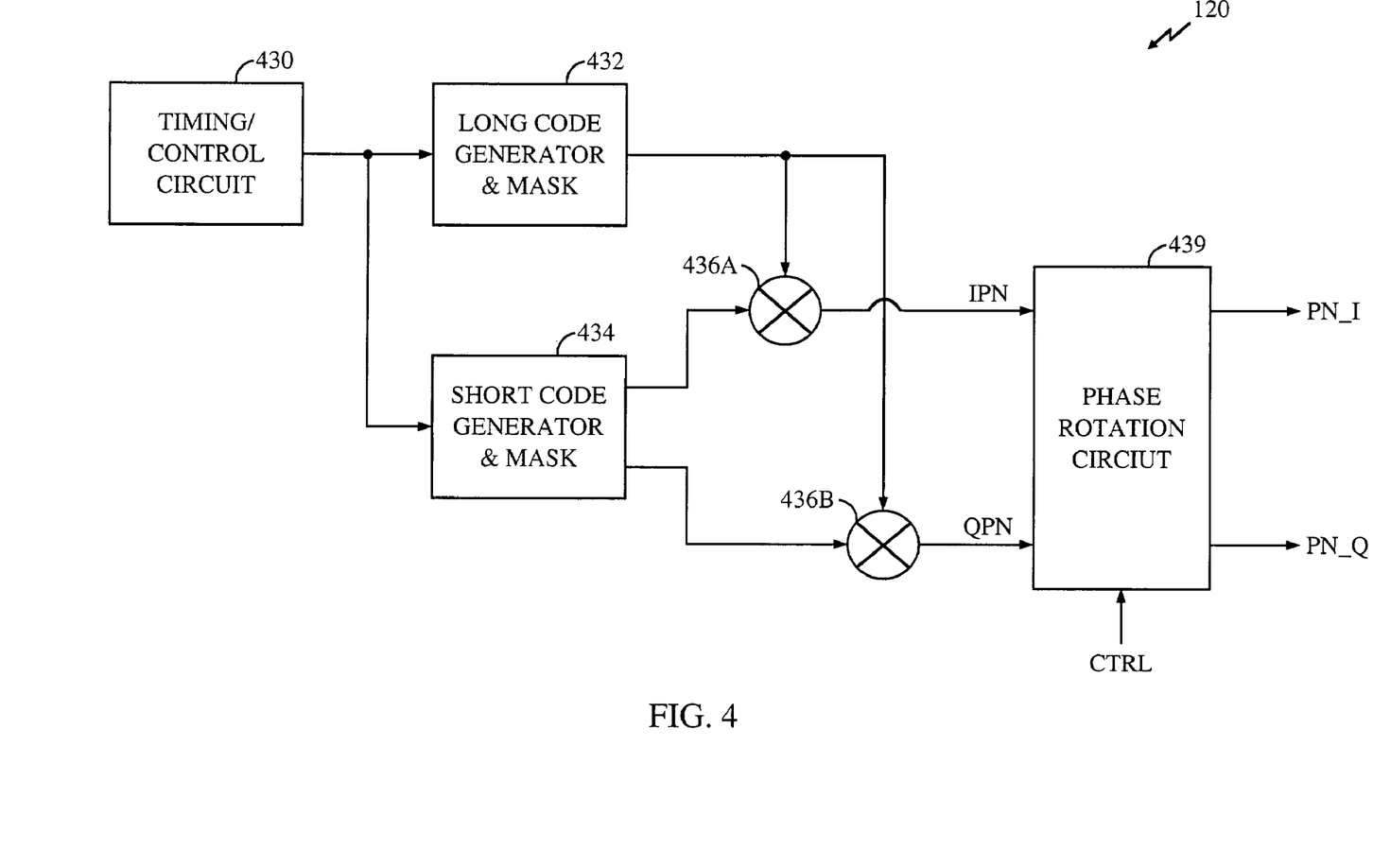
FIG. 4 shows a block diagram of a specific embodiment of a PN generator.

FIG. 4 shows a block diagram of a specific embodiment of PN generator 120 designed to generate the PN_I and PN_Q sequences. In a specific embodiment, the data to be transmitted is spread with a long PN code and short PN codes. The long PN code scrambles the data such that the receiving device (e.g., a base station) is able to identify the particular transmitting device (e.g., a particular mobile station). The short PN codes spectrally spread the data over the entire available system bandwidth. As shown in FIG. 4, a long PN sequence is generated by a long code generator 432, based on a long PN code, and provided to multipliers 436a and 436b. A pair of short PN sequences are generated by a short code generator 434, based on a pair of short PN codes, and also provided to multipliers 436a and 436b. The long and short PN codes can be those defined by a CDMA standard (e.g., the IS-95-A standard).

Each multiplier 436 multiplies the received long and short PN sequences to generate a respective output PN sequence. The IPN and QPN sequences from multipliers 436a and 436b, respectively, are provided to a phase rotation circuit 438 that phase rotate the sequences, as directed by a control signal CTRL. The phase rotated PN_I and PN_Q sequences are used to spread the data. A timing/control circuit 430 provides the timing signal for PN generators 432 and 434 such that the PN sequences can be started at a particular time.

Referring back to FIGS. 2 and 3, the $I_{DATA}$ and $Q_{DATA}$ are first spectrally spread with the PN_I and PN_Q sequences and subsequently modulated with the I_LO and Q_LO. The phase rotation of the invention can be performed at either of these stages, or both. The phase rotation at the spreading stage (i.e., via multipliers 210) can be performed by rotating the phases of the PN sequences or the phases of the data, as described below. The phase rotation at the modulation stage can be performed by rotating the phases of the I_LO and Q_LO carrier signals.

Figure 5:
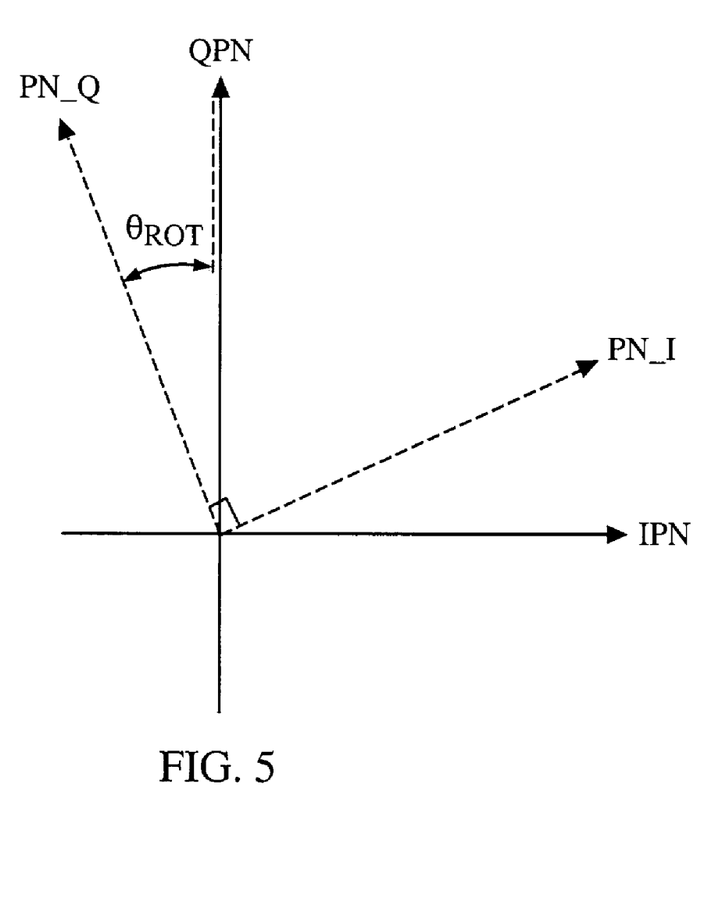
FIG. 5 shows a diagram that illustrates the phase rotation of a pair of quadrature PN sequences.

FIG. 5 shows a diagram that illustrates the phase rotation of the quadrature PN sequences. The IPN and QPN sequences (i.e., the inputs of phase rotation circuit 438) are shown as phasors on the horizontal and vertical axes, respectively. The PN_I and PN_Q sequences (i.e., the output of phase rotation circuit 438) are shown as dashed phasors. The phase difference between the output PN sequences (e.g., PN_Q) and the input PN sequences (e.g., QPN) is a phase rotation of $\theta_{ROT}$. The PN_I and PN_Q sequences can be computed as:

$$PN\_I = [IPN \cdot \cos(\theta_{ROT}) - QPN \cdot \sin(\theta_{ROT})], \text{ and} \qquad (4)$$

$$PN\_Q = [IPN \cdot \sin(\theta_{ROT}) + QPN \cdot \cos(\theta_{ROT})]. \qquad (5)$$

A specific implementation of the invention is now described for transmitter 100 shown in FIG. 1, in which two control signals CTRL[1:0] are provided. One control signal (e.g., CTRL1) adjusts the gain of VGA 134 and the other control signal (e.g., CTRL0) adjusts the bias current of PA/DRV 136. Each set of specific control values of CTRL [1:0] defines a particular operating state of the transmitter. For example, the control values of CTRL[1:0]=00 can define a low gain, low bias current operating state, the control values of 01 can define a low gain, high bias current operating state, the control values of 10 can define a high gain, low bias current operating state, and the control values of 11 can define a high gain, high bias current operating state. Each operating state can be associated with a particular phase rotation of the modulated signal. One of the operating states is designated as the baseline state having a phase rotation of zero. The remaining operating states are each associated with a particular phase rotation relative to the baseline state. For example, the operating states of CTRL [1:0]=00, 01, 10, and 11 can be associated with phase rotations of 0, $\pi/2$, $\pi$, and $3\pi/2$, respectively.

When the transmitter is adjusted, or set, to a new operating state, the phase rotation associated with the new operating state is determined. The phases of the PN sequences are then rotated by the determined phase rotation to compensate for the phase rotation due to the circuit elements operating at the new operating state. The PN sequences are rotated at approximately the same time that the circuit element(s) are adjusted. By rotating the phases of the PN sequences by approximately the same amount, in the opposite direction, and at approximately the same time, phase discontinuity in the modulated signal is reduced.

Each of the operating states, as identified by the control signals CTRL[1:0], is associated with one of the four possible phase rotation values. In a simple implementation, four phase rotation values of 0, $\pi/2$, $\pi$, and $3\pi/2$ are provided and identified by the signals PHASE[1:0]. In this implementation, the phase rotated PN_I and PN_Q sequences can be generated from the input IPN and QPN sequences as shown in Table 1.

TABLE 1

| PHASE[1:0] | | Phase Rotation | PN_I | PN_Q |
| --- | --- | --- | --- | --- |
| 0 | 0 | 0 | IPN | QPN |
| 0 | 1 | $\pi/2$ | −QPN | IPN |
| 1 | 0 | $\pi$ | −IPN | −QPN |
| 1 | 1 | $3\pi/2$ | QPN | −IPN |

When a new operating state is selected, as identified by the control signals CTRL[1:0], the phase rotation associated with this new operating state is determined. The mapping of operating states to phase rotation values can be achieved with a look-up table (LUT), combinatorial logic, or other implementations. The PN_I and PN_Q sequences are then adjusted, as required and by the amount identified by the signals PHASE[1:0], to provide the desired phase rotation.

Figure 6:
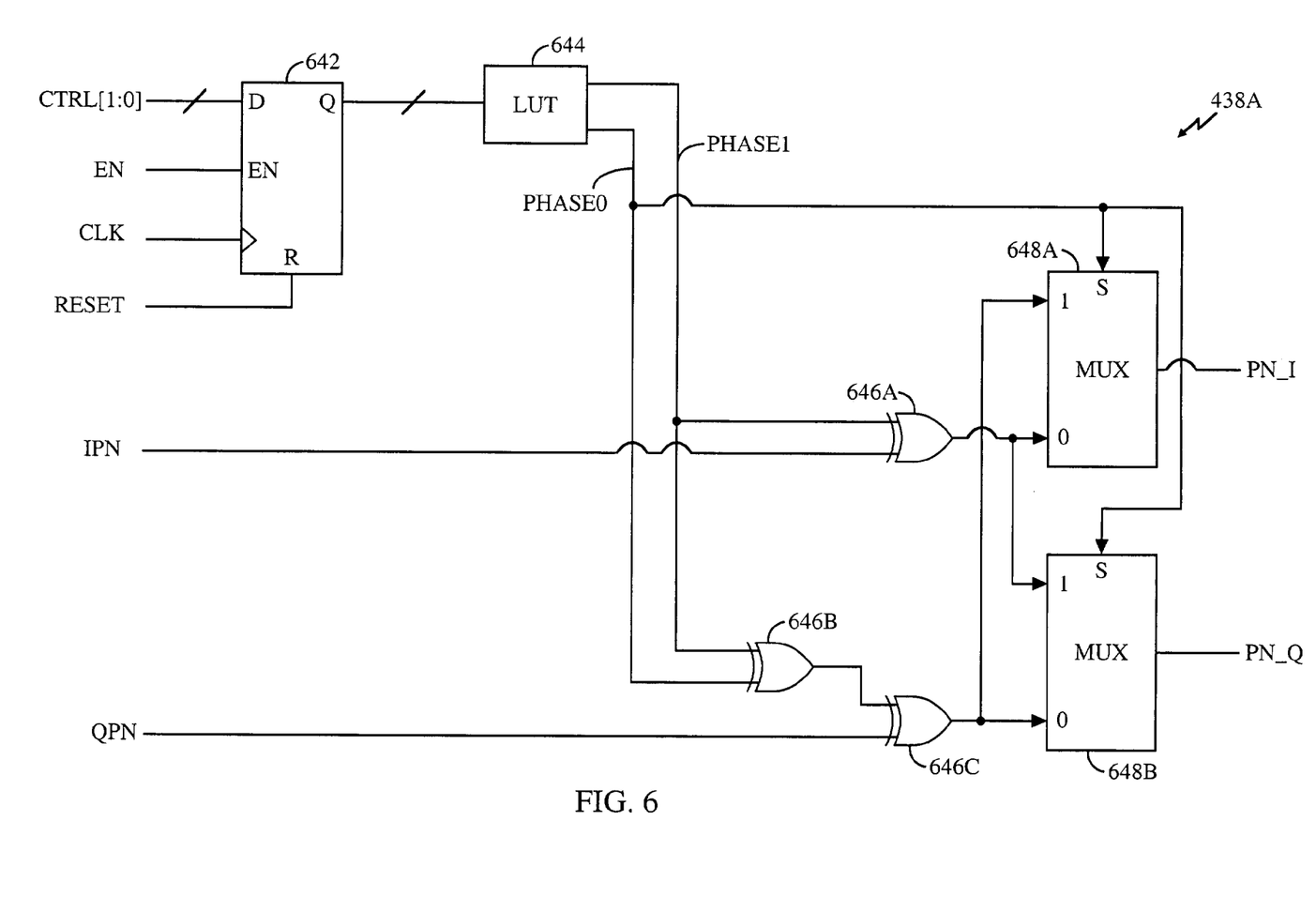
FIGS. 6 and 7 show block diagrams of two specific embodiments of a phase rotation circuit.

FIG. 6 shows a block diagram of a specific embodiment of a phase rotation circuit 438a that implements the phase rotations shown in Table 1. In this embodiment, each operating state is associated with one or four possible phase rotation values. The control signals CTRL[1:0] identify the particular operating state and the signals PHASE[1:0] identify the particular phase rotations value. The control signals CTRL[1:0] are provided to a register 642 that is clocked with a clock signal CLK. The registered values from register 642 are provided to a look-up table 644 that provides a phase rotation value associated with the particular operating state defined by the received control signals CTRL[1:0]. The phase rotation value is provided on the signals PHASE[1:0].

As shown in Table 1, the PN_I and PN_Q sequences are equal to the IPN and QPN sequences, respectively, for a phase rotation of zero. For phase rotations of $\pi/2$ and $3\pi/2$, the IPN and QPN sequences are swapped. The IPN sequence is inverted for phase rotations of $\pi$ and $3\pi/2$, and the QPN sequence is inverted for phase rotations of $\pi/2$ and $\pi$. Exclusive-or (XOR) gates 646 and multiplexers (MUXes) 648 are used to implement these relationships.

As shown in FIG. 6, the signal PHASE1 is provided to one input of an XOR gate 646a and the IPN sequence is provided to a second input of XOR gate 646a. XOR gate 646a inverts the IPN sequence when the phase rotation is $\pi$ or $3\pi/2$. The output of XOR gate 646a is provided to the "0" input of a MUX 648a and the "1" input of a MUX 648b.

The signals PHASE[1:0] are provided to the inputs of an XOR gate 646b. When the phase rotation is $\pi/2$ or $\pi$, XOR gate 646b generates a logic high that is used to invert the QPN sequence. The output of XOR gate 646b is provided to one input of an XOR gate 646c and the QPN sequence is provided to a second input of XOR gate 646c. XOR gate 646c inverts the QPN sequence when the phase rotation is π/2 or π. The output of XOR gate 646c is provided to the "1" input of MUX 648a and the "0" input of MUX 648b. The signal PHASE0 is provided to a select (S) input of MUXes 648a and 648b to swap the PN sequences when the phase rotation is π/2 or 3π/2.

Register 642 also receives an enable signal EN that allows the register to update at designated times. The enable signal EN can be used to align the phase rotation of the PN sequences with the adjustment of the circuit elements associated with the transmit signal path. In this manner, when the phase of the modulated signal rotates due to adjustment of the circuit elements, a corresponding phase rotation compensation is performed on the modulated signal to approximately cancel the phase rotation due to the circuit elements. The reset signal RESET can be used to reset the register, and can be asserted (e.g., to logic high), for example, when a software reset bit is set or when a hardware reset line is active.

In the simple embodiment shown in FIG. 6, two control signals CTRL[1:0] are provided, with each control signal controlling one circuit element and having a value of either "0" or "1". Generally, the transmit signal path may include any number of adjustable circuit elements. Moreover, each circuit element can be adjusted to one of any number of states. For example, it may be desirable to adjust the gain of a VGA with four bits of resolution and the bias current of a circuit element with eight bits of resolution. Each specific setting of the circuit elements corresponds to a specific operating state of the transmit signal path. Although each operating state can be associated with a particular phase rotation of the modulated signal, it may be desirable to provide phase rotation compensation for only a subset of the possible operating states. For the example above, although the bias current of the circuit element may be adjusted with eight bits of resolution, it may be desirable to provide phase rotation compensation for eight operating states defined by the three most significant bits of the control signal for this circuit element.

Generally, each control signal can be used to adjust a particular characteristic of one or more circuit elements. For example, it may be desirable to adjust the gains of two VGAs in the transmit signal path using one common control signal. For simplicity, the M control signals for the M or more circuit elements for which phase rotation compensation is desired are concatenated into N bits, where M≦N.

Figure 7:
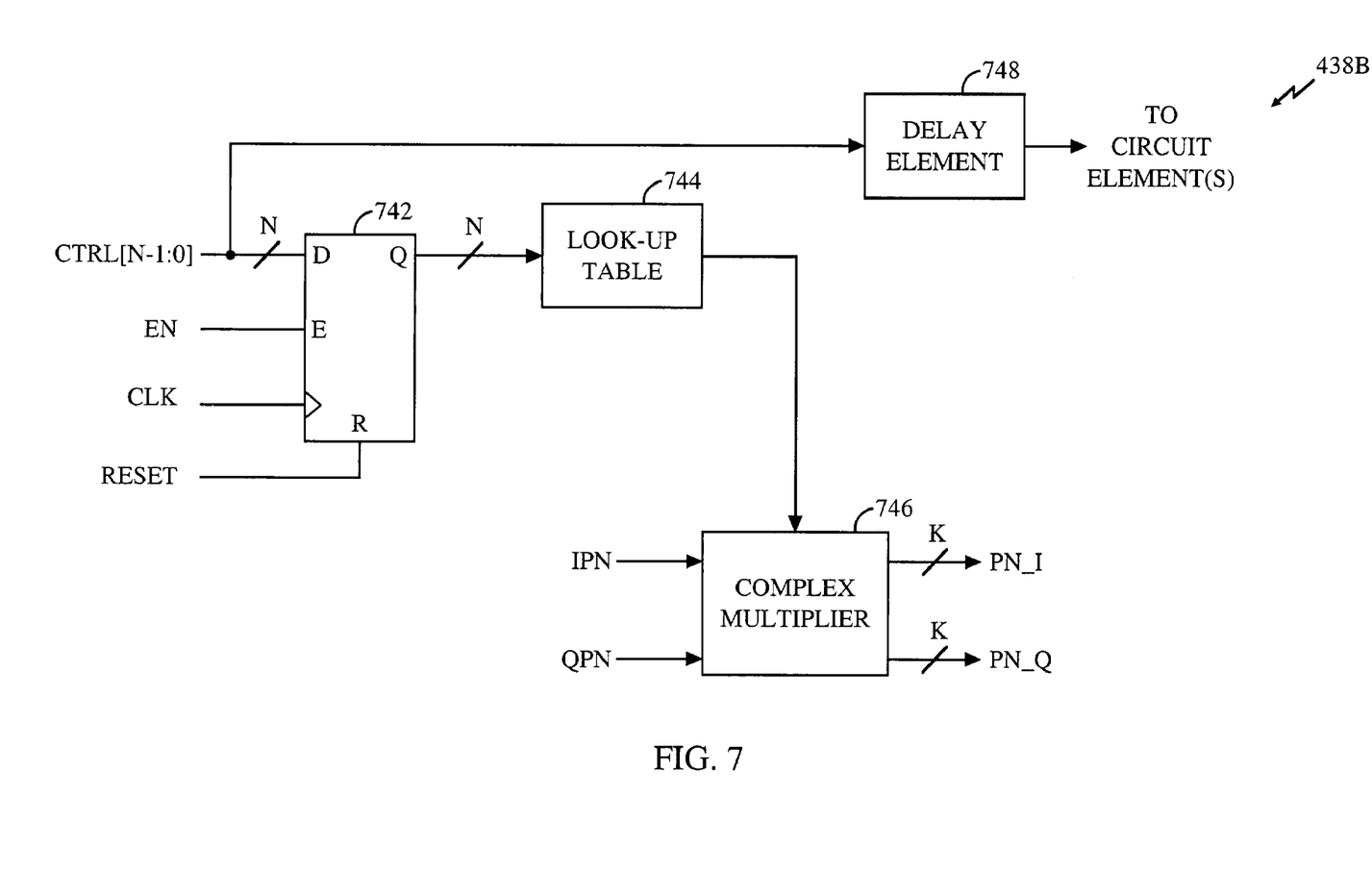

FIG. 7 shows a block diagram of a specific embodiment of a phase rotation circuit 438b that can be used to generate any number of phase rotation values. The N bits of control signals CTRL[N-1:0] are provided to a register 742 that is clocked with the clock signal CLK. The registered value is provided to a look-up table 744 that provides a phase rotation value associated with the operating state defined by the received control signals.

In an embodiment, L phase rotation values are stored in look-up table 744. Each operating state, as defined by the received control signals CTRL[N-1:0], is associated with one of the L phase rotation values. In an embodiment, each of the phase rotation values stored in look-up table 744 has P bits of resolution and identifies a particular phase rotation of between 0 and 2π.

A phase rotation value $\theta_F$ corresponding to the operating state defined by the received control signals is provided from LUT 744 to a complex multiplier 746 that also receives the IPN and QPN sequences. Multiplier 746 multiplies the received PN sequences with the appropriate sine and cosine of the received phase rotation value $\theta_F$ in accordance with equations (4) and (5) to generate the phase rotated PN sequences. The phase rotation value $\theta_F$ is substituted for the phase rotation value $\theta_{ROT}$ in equations (4) and (5). Multiplier 746 provides the output PN_I and PN_Q sequences having a phase rotation of between 0 and 2π from the input IPN and QPN sequences.

Complex multiplier 746 can be implemented with logic, a look-up table, or other circuits. Complex multiplier 746 can also be integrated with look-up table 744. Each of the IPN and QPN sequences typically has one bit of resolution. Each of the output PN sequences from multiplier 746 can have K bits of resolution. A look-up table having $2K \cdot 2^{P+2}$ bits can be used to implement complex multiplier 746. Since the output PN sequences are sinusoid in nature, the look-up table can be simplified by storing one quadrant of the sinusoid and deriving the other three quadrants from the stored quadrant.

FIG. 7 also shows a mechanism for aligning the control signals provided to the circuit elements such that phase discontinuity in the modulated signal is reduced when the circuit element(s) are adjusted. The control signals CTRL [N-1:0] are provided to a delay element 748 that delays each of the control signals by an appropriate amount. Referring to FIG. 1, the bias control signal for PA/DRV 136 may be delayed slightly more than the gain control signal for VGA 134, to compensate for the delay of VGA 134. The delayed control signals from delay element 748 are provided to the circuit element(s).

As noted above, the phase rotation can be performed at various locations in the transmit signal path. For example, the phase rotation can be performed on the complex data (i.e., the $I_{DATA}$ and $Q_{DATA}$), the complex PN sequences (i.e., IPN and QPN), or the carrier signals (i.e., I_LO and Q_LO). These various forms of phase rotation can be expressed as:

$$s(t) = \text{Re}\{m(t) \cdot p(t) \cdot e^{j\overline{\omega}_c t} e^{j\theta_{ROT}}\} \qquad (6)$$

$$= \text{Re}\{m(t) \cdot [p(t) \cdot e^{j\theta_{ROT}}] \cdot e^{j\overline{\omega}_c t}\}$$

$$= \text{Re}\{[m(t) \cdot e^{j\theta_{ROT}}] \cdot p(t) \cdot e^{j\overline{\omega}_c t}\}$$

$$= \text{Re}\{m(t) \cdot p(t) \cdot e^{j(\overline{\omega}_c t + \theta_{ROT})}\}, \text{ and}$$

where s(t) is the output modulated signal, m(t) is the data sequence, p(t) is the PN sequence, and $e^{j\overline{\omega}_c t}$ is the carrier signal.

Figure 8A:
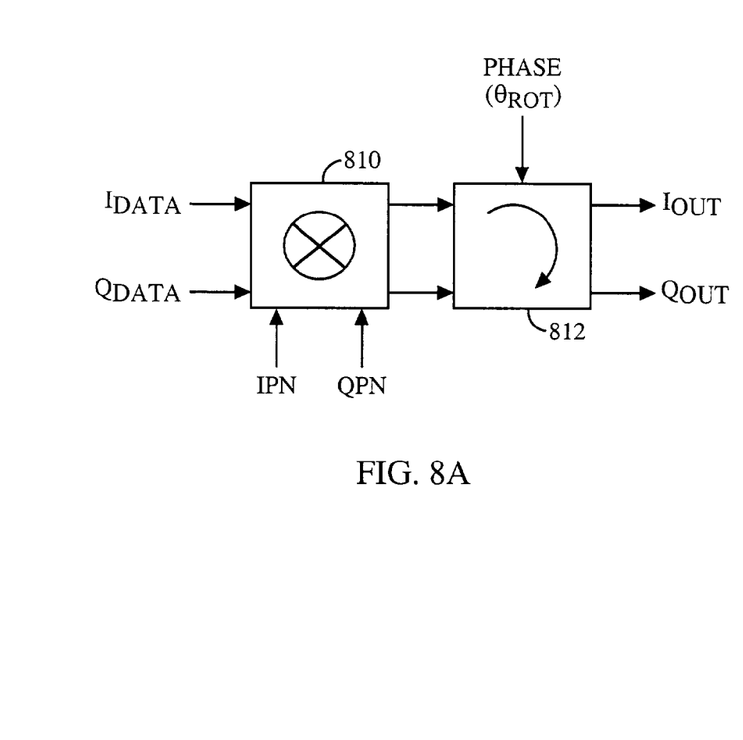
FIGS. 8A and 8B show block diagrams of two implementations of the phase rotation.
Figure 8B:
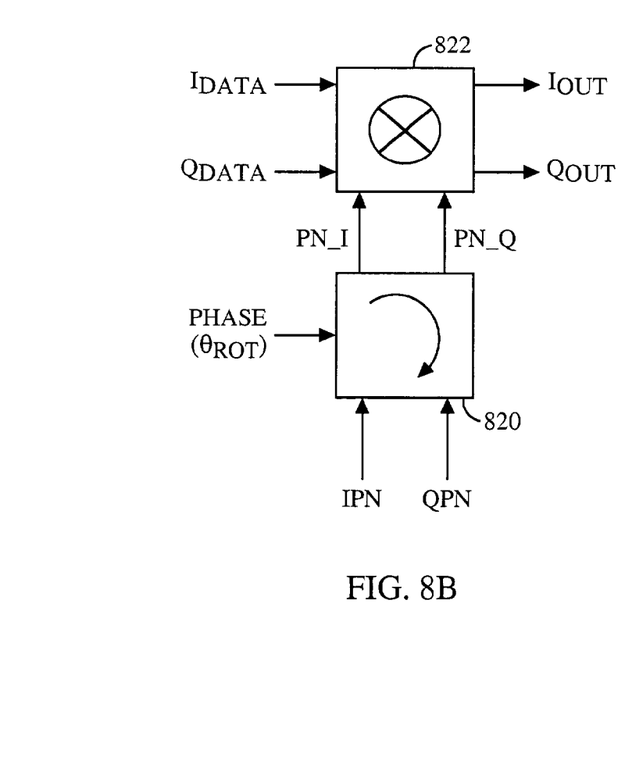

FIGS. 8A and 8B show block diagrams of two implementations of the phase rotation of the invention. FIG. 8A shows phase rotation of the spread data, and FIG. 8B shows phase rotation of the PN spreading sequences.

In FIG. 8A, a spreader 810 receives and spreads the complex data ($I_{DATA}$ and $Q_{DATA}$) with the complex PN sequence (IPN and QPN) and provides the spread data to a phase rotator 812. Phase rotator 812 also receives a signal indicative of the desired phase rotation ($\theta_{ROT}$) and rotates the spread data by the phase amount of $\theta_{ROT}$. The phase rotation can be performed digitally or at the modulation stage, as described above.

In FIG. 8B, a phase rotation circuit 820 receives and rotates the complex PN sequence (IPN and QPN) by the phase amount of $\theta_{ROT}$ and provides the rotated PN sequences (PN_I and PN_Q) to a spreader 822. Spreader 822 also receives and spreads the complex data ($I_{DATA}$ and $Q_{DATA}$) with the complex PN sequence (PN_I and PN_Q) to generate the spread data. For some specific implementations (e.g., phase rotation in increments of 90°), this implementation may be more computationally efficient since the PN sequences typically have one bit of resolution and the phase rotation can be easily achieved with simple circuitry, as described above, The amount of phase rotation in the modulated signal caused by adjustment of circuit elements can be determined through various means. For example, the phase rotation can be determined by circuit simulation, empirical measurements of the transmitter, or by other means. For each circuit configuration (i.e., each particular operating state defined by the control signals CTRL[N-1:0]), the phase of the modulated signal is determined. A baseline operating state is selected, and the phase value associated with each remaining operating state is compared against the phase value of the baseline state to obtain the phase rotation value for the operating state. Each operating state is thus mapped to, or associated with, a particular phase rotation value.

In an embodiment, a look-up table stores the phase rotations for various operating states. The look-up table can be loaded when the transmitter is initialized or when a reset signal is received. Alternatively, the phase rotation values can be provided on a system bus (i.e., from another integrated circuit) whenever the control signals change state.

In the description above, phase rotation compensation is provided by rotating the phases of the PN sequences. The phase rotation can also be provided by rotating the data, such as the $I_{DATA}$ and $Q_{DATA}$ in FIG. 2. In some transmitter designs, the data may comprise more bits of resolution than the PN sequences, in which case rotating the PN sequences may require less circuitry.

The phase rotation compensation can also be performed at other points along the transmit signal path. For example, the phase rotation can also be performed by rotating the carrier signals used to modulate the data. Referring back to FIG. 3, the filtered I and Q data are modulated by the inphase (I_LO) and quadrature (Q_LO) carrier signals, respectively, by a modulator comprised of multipliers 320a and 320b. To rotate the phase at the modulation stage, the phases of the inphase and quadrature carrier signals can be rotated to provide the required phase rotation of the modulated signal.

In some embodiments of the invention, the phase rotation is performed digitally for ease of implementation and to provide consistent, performance. The digital implementation allows for phase rotation in discrete steps, although the step size can vary depending on the resolution of the signal PHASE. The phase rotation can also be performed using analog signals (e.g., at the modulation stage). The analog implementation may allow for phase rotation compensation in a more continuous manner.

The elements shown in FIG. 1 can be implemented in various manners. The digital processing elements (e.g., encoder 114, spreader 118) can be implemented in hardware with special circuitry, by software executed on a processor (e.g., controller 116), or a combination of both. Controller 116 can be implemented with a microcomputer, a microprocessor, a processor, a signal processor, an application specific integrated circuit (ASIC), or other electronic units designed to perform the functions described herein. The look-up tables can be implemented using a random-access memory (RAM), a dynamic RAM (DRAM), a read-only memory (ROM), a programmable ROM (PROM), an electronically programmable ROM (EPROM), a FLASH memory, other memory devices, or any combination thereof.

As shown in FIG. 1, the control signals CTRL[1:0] adjust the characteristics of the circuit elements located in the direct transmission path. The invention can also be used to compensate for phase rotation due to adjustment of other circuit elements not in the direct transmission path. For example, a voltage-controlled oscillator (VCO) and its associated buffer may have their bias currents adjusted to reduce power consumption. Adjustment of the bias currents of these circuit elements may cause variation in the phase of the signal generated by the VCO, which can cause a phase rotation in the modulated signal. Thus, as the VCO and/or buffer is adjusted, a phase of the modulated signal can be rotated to compensate for the phase rotation in the modulated signal due to these circuit elements.

The invention described herein can be applied to many communications systems such as CDMA communications systems. The invention is applicable to various CDMA systems that currently exist and new systems that are continually being considered. A specific CDMA system is described in the aforementioned U.S. patent application Ser. No. 08/963,386, now U.S. Pat. No. 6,574,211, issued on Jun. 3, 2003 to Padovani et al. This system includes a spreader in the transmitting unit at the base station and at the mobile station. The spreader spectrally spreads the received data with a pair of PN sequences in a manner similar to that described above. Another CDMA system is disclosed in the aforementioned U.S. Pat. No. 4,901,307 and U.S. Pat. No. 5,103,459.

The invention is particularly applicable to a mobile station of a CDMA system, which is required to adjust its output transmit power over a large range (e.g., 85 dB). The mobile station may include multiple circuit elements having variable gains and multiple circuit elements having adjustable bias currents, to reduce power consumption and to extend the operating life of the unit.

The invention can also be applied to other communications systems that employs other modulation techniques such as time division multiple access (TDMA), frequency division multiple access (FDMA), frequency modulation (FM), and amplitude modulation (AM) schemes such as amplitude companded single sideband (ACSSB). The invention can also be applied to other transmission systems such as broadcast television, paging, and others.

The invention can be extended to provide phase adjustment of the modulated signal due to phase shift introduced by the circuit elements associated with the transmit signal path. As the circuit elements are adjusted, the phase of the modulated signal can be shifted to compensate for the phase shift introduced by the circuit elements, to reduce phase discontinuity in the modulated signal.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method comprising:
   determining a phase rotation of a modulated signal that is caused by an adjustment of a characteristic of a circuit element associated with a signal path of the modulated signal, based on a gain control signal and a bias control signal; and
   performing a phase rotation compensation with respect to the modulated signal to compensate for the phase rotation caused by the adjustment of the characteristic of the circuit element, wherein the phase rotation compensation comprises rotating a phase of at least one of (a) a data signal, (b) a spreading sequence for spectrally spreading the data signal, and (c) a carrier signal for modulating the data signal, wherein performing the phase rotation compensation further comprises:
determining a direction and an amount of the phase rotation of the modulated signal, wherein the direction and amount are associated with the gain control signal and the bias control signal; and
rotating the phase of the modulated signal by an amount corresponding to the determined amount of the phase rotation in an opposite direction relative to the direction of the determined phase rotation.

2. The method of claim 1 wherein the gain control signal and the bias control signal are used to adjust one or more characteristics of the circuit element according to an operating state defined by the gain control signal and the bias control signal.

3. The method of claim 1 wherein rotating the phase of the modulated signal is performed using a complex multiplier.

4. The method of claim 1 wherein rotating the phase of the modulated signal is performed digitally.

5. The method of claim 1 wherein a time at which the phase rotation compensation is performed corresponds to a time of the adjustment.

6. The method of claim 5 wherein the time at which the phase rotation compensation is performed is aligned with the time of the adjustment such that phase discontinuity in the modulated signal is reduced when the adjustment occurs.

7. The method of claim 5 wherein the time at which the phase rotation compensation is performed is approximately the same as the time of the adjustment.

8. The method of claim 1 wherein performing comprises:
rotating phases of pseudo-random noise (PN) sequences used to spectrally spread data from which the modulated signal is generated.

9. The method of claim 8 wherein the pseudo-random noise (PN) sequences comprise pseudo-random noise (PN) sequences in accordance with IS-95-A standard.

10. The method of claim 1 wherein performing comprises:
rotating phases of data that are used to generate the modulated signal.

11. The method of claim 1 wherein performing comprises:
rotating phases of one or more carrier signals that are used to generate the modulated signal.

12. The method of claim 1 wherein each value of the gain control signal and the bias control signal corresponds to a particular phase rotation value.

13. The method of claim 12 wherein phase rotation values corresponding to values of the gain control signal and the bias control signal are stored in a look-up table and wherein determining the phase rotation is performed using the look-up table.

14. The method of claim 1 wherein rotating the phase of the modulated signal is performed in discrete increments.

15. The method of claim 1 wherein the circuit element is located directly in the signal path.

16. The method of claim 1 wherein the circuit element is operatively coupled to the signal path.

17. A method comprising:
determining a phase shift of a modulated signal caused by one or more circuit elements associated with a signal path of the modulated signal, based on a gain control signal and a bias control signal; and
performing a phase adjustment with respect to the modulated signal to compensate for the phase shift caused by the one or more circuit elements associated with the signal path, wherein the phase adjustment comprises adjusting a phase of at least one of (a) a data signal, (b) a spreading sequence for spectrally spreading the data signal, and (c) a carrier signal for modulating the data signal, wherein performing the phase adjustment further comprising:
determining a direction and an amount of the phase shift of the modulated signal, wherein the amount of the phase shift is associated with the gain control signal and the bias control signal; and
shifting the phase of the modulated signal by an amount corresponding to the determined amount of the phase shift in an opposite direction relative to the direction of the determined phase shift.

18. The method of claim 17 wherein the gain control signal and the bias control signal are used to adjust one or more characteristics of the one or more circuit elements according to an operating state defined by the gain control signal and the bias control signal.

19. A method comprising:
receiving at least one data stream and a pair of pseudo-random noise (PN) sequences;
spreading the at least one data stream with the pair of pseudo-random noise (PN) sequences to generate spread data;
modulating the spread data to generate a modulated signal;
conditioning the modulated signal with at least one circuit element to generate an output signal, based on a gain control signal and a bias control signal which are used to adjust one or more characteristics of the at least one circuit element;
compensating a phase rotation of the output signal which is caused by adjustment of the one or more characteristics of the at least one circuit element, based on the gain control signal and the bias control signal, wherein compensating the phase rotation comprises rotating a phase of at least one of (a) the pseudo-random noise (PN) sequences, (b) the spread data, and (c) one or more carrier signals that are used to modulate the spread data, wherein compensating the phase rotation further comprises:
determining a direction and an amount of the phase rotation of the modulated signal, wherein the direction and the amount are associated with the gain control signal and the bias control signal; and
rotating the phase of the modulated signal by an amount corresponding to the determined amount of the phase rotation in an opposite direction relative to the direction of the determined phase rotation.

20. An apparatus comprising:
a signal processor to receive a data stream and generate a modulated signal based on the data stream;
at least one circuit element coupled to the signal processor to condition the modulated signal based on a gain control signal and a bias control signal which are used to adjust one or more characteristics of the at least one circuit element, wherein the signal processor comprises:
a spreader to spread the data stream with pseudo-random noise (PN) sequences to generate spread data, and
a modulator to modulate the spread data with one or more carrier signals, wherein a phase rotation of the modulated signal caused by adjustment of one or more characteristics of the at least one circuit element is determined and compensated based on the gain control signal and the bias control signal, and is further based on rotating a phase of at least one of (a) the pseudo-random noise (PN) sequences, (b) the spread data generated by the spreader, and (c) one or more carrier signals that are used to modulate the spread data, wherein the phase rotation is by an amount of the determined phase rotation and in an opposite direction relative to the direction of the determined phase rotation.

21. The apparatus of claim 20 wherein the phase rotation of the modulated signal caused by the adjustment of the one or more characteristics is determined using a look-up table that stores a set of phase rotation values each of which corresponds to a value of the gain control signal and the bias control signal.

22. The apparatus of claim 20 wherein the at least one circuit element comprises a variable gain element having a gain determined by the gain control signal.

23. The apparatus of claim 22 wherein the variable gain element is a variable gain amplifier (VGA).

24. The apparatus of claim 20 wherein the at least one circuit element comprises an active circuit element having a bias current determined by the bias control signal.

25. The apparatus of claim 24 wherein the active circuit element is a power amplifier (PA).

* * * * *